United States Patent
Haran

(10) Patent No.: US 10,401,616 B2
(45) Date of Patent: Sep. 3, 2019

(54) AMPLITUDE CONTROL DURING START-UP OF RESONATING MIRROR

(71) Applicant: STMicroelectronics Ltd, Netanya (IL)

(72) Inventor: Elik Haran, Kfar Saba (IL)

(73) Assignee: STMicroelectronics Ltd., Netanya (IL)

( * ) Notice: Subject to any disclaimer, the term of this patent is extended or adjusted under 35 U.S.C. 154(b) by 126 days.

(21) Appl. No.: 15/617,032

(22) Filed: Jun. 8, 2017

(65) Prior Publication Data

US 2018/0356627 A1 Dec. 13, 2018

(51) Int. Cl.
*G02B 26/08* (2006.01)
*G02B 26/10* (2006.01)

(52) U.S. Cl.
CPC ....... *G02B 26/0833* (2013.01); *G02B 26/105* (2013.01)

(58) Field of Classification Search
CPC .......... G02B 26/0841; G02B 26/105; G02B 26/085; G02B 26/0858; G02B 26/0833; G02B 26/101; B81B 3/0083; B81B 3/0086; B81B 2203/04
See application file for complete search history.

(56) References Cited

U.S. PATENT DOCUMENTS 6,590,606 B1 * 7/2003 Hiller .................. H04N 9/3129
348/203

* cited by examiner

*Primary Examiner* — Jennifer D. Carruth
(74) *Attorney, Agent, or Firm* — Crowe & Dunlevy

(57) ABSTRACT

Disclosed herein is a control circuit for a movable mirror. The control circuit includes driving circuitry configured to drive the movable mirror with a drive signal to effectuate oscillating of the movable mirror, opening angle determination circuitry configured to determine an opening angle of the movable mirror, and amplitude control circuitry. The amplitude control circuitry is configured to a) first cause the driving circuitry to generate the drive signal as having an upper threshold drive amplitude, and b) then later cause the driving circuitry to generate the drive signal as having a nominal drive amplitude, as a function of the opening angle of the movable mirror being equal to a desired opening angle.

14 Claims, 6 Drawing Sheets

AMPLITUDE CONTROL DURING START-UP OF RESONATING MIRROR

TECHNICAL FIELD

This disclosure relates generally to the driving of micromirrors for image scanning, and, more particularly, to methods of driving said micromirrors during an initialization or startup period.

BACKGROUND

Certain devices such as wafer defect scanners, laser printers, document scanners, projectors and the like employ a collimated laser beam that scans across a flat surface in a straight line or curved path. These devices employ tilting mirrors to deflect the beam to perform the scanning. These tilting mirrors may be, or may include, Micro Electro Mechanical Systems ("MEMS") devices. The actuation of mirrors used in MEMS devices, referred to herein as MEMS mirrors, can be via the electromagnetic, electrostatic, piezoelectric, and thermoelectric effects, depending on application.

One type of common MEMS mirror includes a stator and a rotor, with the rotor or structures carried by the rotor being reflective. The stator and/or rotor are driven with a drive signal which results in the rotor oscillating with respect to the stator, thereby changing the angle of reflectance of an incident light beam on the rotor. By oscillating the rotor between two orientations, an opening angle of the mirror is defined, and scanning of the light beam across the flat surface is accomplished.

When a device employing such a MEMS mirror, which is actuated in its self-resonance, is switched on, the MEMS mirror begins an initialization or startup period during which it goes from rest to a oscillating at a resonant frequency and with a desired opening angle. So as to enable full performance of such devices as quickly as possible, it is desirable for this initialization period to be minimized. Conventional MEMS mirrors are simply driven with a constant amplitude drive signal in both an initialization mode and a normal operation mode, which may provide for a longer initialization period than desired. Therefore, further development into techniques for reducing the initialization period of a resonating MEMS mirror is needed.

SUMMARY

Figure 1:
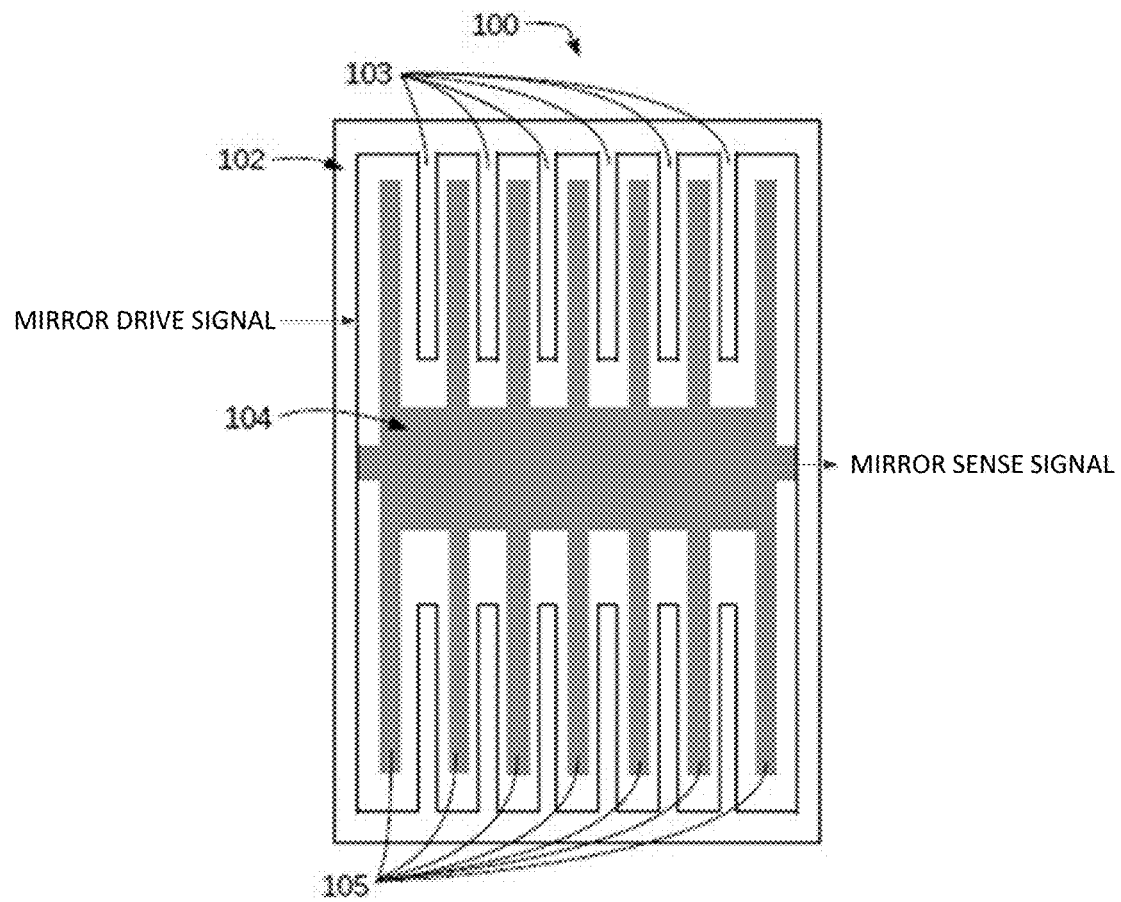
FIG. 1 is a top plan view of a movable MEMS mirror such as may be used with the techniques described in this disclosure.

Disclosed herein is a control circuit for a movable mirror. The control circuit includes driving circuitry configured to drive the movable mirror with a drive signal to effectuate oscillating of the movable mirror, opening angle determination circuitry configured to determine an opening angle of the movable mirror, and amplitude control circuitry. The amplitude control circuitry is configured to a) first cause the driving circuitry to generate the drive signal as having an upper threshold drive amplitude, and b) then later cause the driving circuitry to generate the drive signal as having a nominal drive amplitude, as a function of the opening angle of the movable mirror being equal to a desired opening angle.

The amplitude control circuitry may be further configured to between a) and c), cause the driving circuitry to generate the drive signal as having a first drive amplitude less than the upper threshold drive amplitude but greater than a nominal drive amplitude, as a function of the opening angle of the movable mirror being not equal to a desired opening angle of the movable mirror.

The amplitude control circuitry may be further configured to iteratively cause the driving circuitry to generate the drive signal as having a drive amplitude that is less than the drive amplitude of a previous iteration, as a function of the opening angle of the movable mirror being not equal to the desired opening angle of the movable mirror.

Also disclosed herein is another control circuit for a movable mirror. This control circuit may include driving circuitry configured to drive the movable mirror with a drive signal to effectuate oscillating of the movable mirror, and amplitude control circuitry configured to cause the driving circuitry to generate the drive signal as having an amplitude that decreases from an upper threshold amplitude to a nominal drive amplitude over time.

The amplitude control circuitry may cause the driving circuitry to generate the drive signal as having an amplitude that decreases from an upper threshold amplitude to a nominal drive amplitude over time by causing the driving circuitry to generate the drive signal as having a upper threshold drive amplitude for a first period of time, and after the first period of time, iteratively causing the driving circuitry to generate the drive signal as having a drive amplitude that is less than the drive amplitude of a previous iteration, until an iteration is reached where the drive amplitude is equal to a nominal drive amplitude.

The amplitude control circuitry may cause the driving circuitry to generate the drive signal as having an amplitude that decreases from an upper threshold amplitude to a nominal drive amplitude over time by causing the driving circuitry to generate the drive signal as having a upper threshold drive amplitude, monitoring an opening angle of the movable mirror, and causing the driving circuitry to generate the drive signal as having a nominal drive amplitude, as a function of the opening angle of the movable mirror being equal to a desired opening angle.

The amplitude control circuitry may be further configured to cause the driving circuitry to generate the drive signal as having a first drive amplitude less than the upper threshold drive amplitude but greater than a nominal drive amplitude, as a function of the opening angle of the movable mirror being greater than a threshold value but not equal to a desired opening angle of the movable mirror.

The amplitude control circuitry may be further configured to iteratively cause the driving circuitry to generate the drive signal as having a drive amplitude that is less than the drive amplitude of a previous iteration, as a function of the opening angle of the movable mirror being greater than a threshold value but not equal to the desired opening angle of the movable mirror.

Also disclosed herein is a picoprojector that includes an movable mirror, driving circuitry configured to drive the movable mirror with a drive signal to effectuate oscillating of the movable mirror, an opening angle monitor associated with the movable mirror and configured to monitor the opening angle of the movable mirror, a laser configured to impinge on, and be reflected by, the movable mirror, and amplitude control circuitry. The amplitude control circuitry is configured to cause the driving circuitry to generate the drive signal as having a upper threshold drive amplitude, and cause the driving circuitry to generate the drive signal as having a nominal drive amplitude, as a function of the opening angle of the movable mirror being equal to a desired opening angle.

The amplitude control circuitry may be further configured to cause the driving circuitry to generate the drive signal as having a first drive amplitude less than the upper threshold drive amplitude but greater than a nominal drive amplitude, as a function of the opening angle of the movable mirror being greater than a threshold value but not equal to a desired opening angle of the movable mirror.

The amplitude control circuitry may be further configured to iteratively cause the driving circuitry to generate the drive signal as having a drive amplitude that is less than the drive amplitude of a previous iteration, as a function of the opening angle of the movable mirror being not equal to the desired opening angle of the movable mirror.

Also disclosed herein is a method of driving a movable mirror from rest to a desired opening angle. The method includes monitoring an opening angle of the movable mirror, initially driving the movable mirror with a drive signal having an upper threshold drive amplitude. If the opening angle of the movable mirror is equal to the desired opening angle, then the movable mirror is driven with a drive signal having a nominal drive amplitude. If the opening angle of the movable mirror is greater than the desired opening angle, then over time the drive amplitude of the drive signal is decreased until the opening angle of the movable mirror is equal to the desired opening angle.

Decreasing the drive amplitude of the drive signal over time may include changing the drive amplitude of the drive signal to an intermediate amplitude that is greater than the nominal drive amplitude but less than the upper threshold drive amplitude.

Decreasing the drive amplitude of the drive signal over time may include iteratively generating the drive signal as having a drive amplitude that is less than the drive amplitude of a previous iteration until the drive amplitude of a present iteration is equal to the nominal drive amplitude.

DETAILED DESCRIPTION

One or more embodiments of the present disclosure will be described below. These described embodiments are only examples of the presently disclosed techniques. Additionally, in an effort to provide a concise description, all features of an actual implementation may not be described in the specification.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Like reference numbers in the drawing figures refer to like elements throughout.

First, a movable MEMS mirror 100, such as may be used in devices such as wafer defect scanners, laser printers, document scanners, augmented reality devices, automotive headlamps, Lidar devices, projectors, and pico-projectors, will now be described with reference to FIG. 1. The movable MEMS mirror 100 includes a stator 102 having inwardly projecting fingers 103. A rotor 104 is positioned within the stator 102 and has outwardly projecting fingers 105 that interleave with the inwardly projecting fingers 103 of the stator 102. The rotor 104 oscillates about its axis, oscillating its mirror surface with respect to the stator 102.

Either the stator 102 or the rotor 104 is supplied with a periodic mirror drive signal, such as a square wave, while the other is supplied with a reference voltage.

In the case where the mirror drive signal has an oscillating square voltage, for example, electrostatic forces cause the rotor 104 to oscillate about its axis relative to the stator 102. In the case where the mirror drive signal has an oscillating square current, for example, magnetic forces cause the rotor 104 to oscillate about its axis relative to the stator 102. Indeed, the movable MEMS mirror 100 may be driven according to any suitable way known to those of skill in the art, such as through the use of the piezoelectric effect of thermoelectric effect. As another example, the movable MEMS mirror 100 may be driven by driving current flow through a coil, creating an electromagnetic field used to drive the rotation of the rotor 104. Thus, it should be understood that the techniques, circuits, and methods described herein may be applicable to different types of movable MEMS mirrors 102.

For use in scanning a light beam across a surface, the movable MEMS mirror 100 is driven so that it oscillates at a frequency close to (or at) its resonant frequency between two set or controllable oscillation limits.

Figure 2:
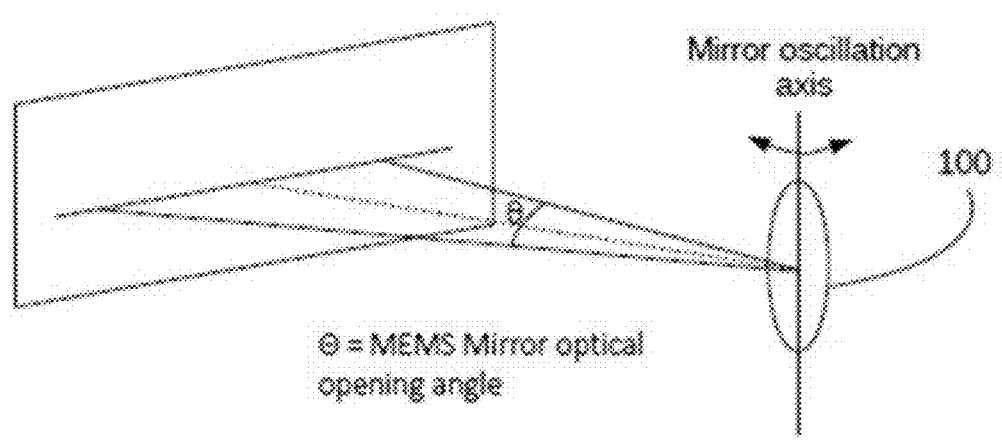
FIG. 2 is a perspective view showing operation of a movable MEMS mirror scanning.

Shown in FIG. 2 is the movable MEMS mirror 100 scanning a light beam across a projection screen between two set rotation limits that define an "opening angle" θ of the movable MEMS mirror 100.

Figure 3A:
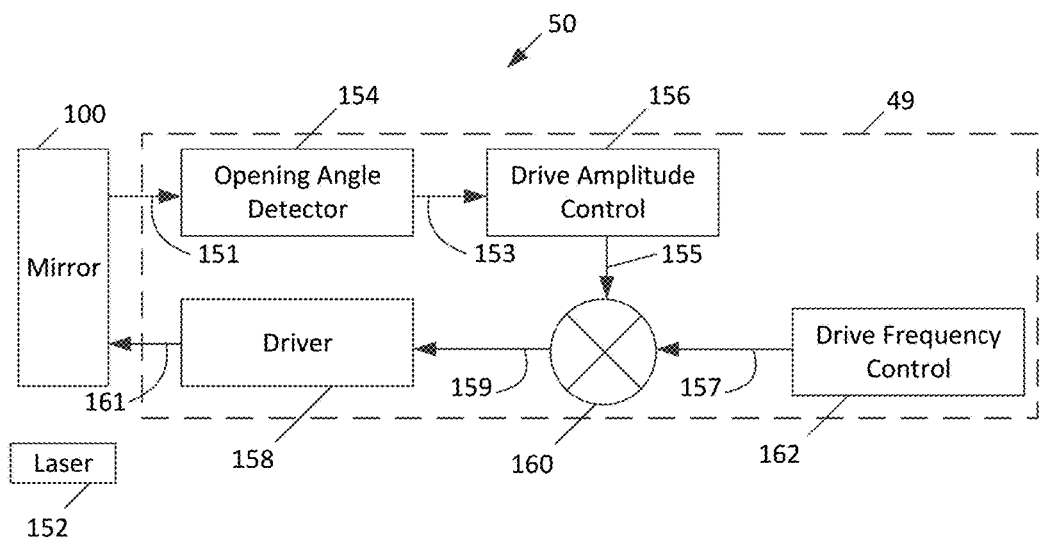
FIG. 3A is a block diagram of a picoprojector in accordance with this disclosure that utilizes a feedback loop.

A picoprojector 50 incorporating the MEMS mirror 100 is now described with reference to FIG. 3A. The picoprojector 50 includes a laser 152 that impinges on the mirror 100 to be reflected thereby across a target surface. The picoprojector 50 also includes a control circuit 49 coupled to the mirror 100. The control circuit 49 includes an opening angle detector 154 that receives a mirror sense signal 151 from the mirror 100, or from a sensor affixed to the mirror 100, and determines the opening angle from the mirror sense signal 151. The opening angle detector 154 outputs an opening angle signal 153 to a drive amplitude control block 156, which generates a drive adjustment 155. The drive adjustment 155 is modulated by the mixer 160 to generate a drive control signal 159, based upon a drive frequency signal 157 received from a drive frequency control 162. The driver 158 generates a drive signal 161 for the mirror 100 based upon the drive control signal 159.

Figure 4A:
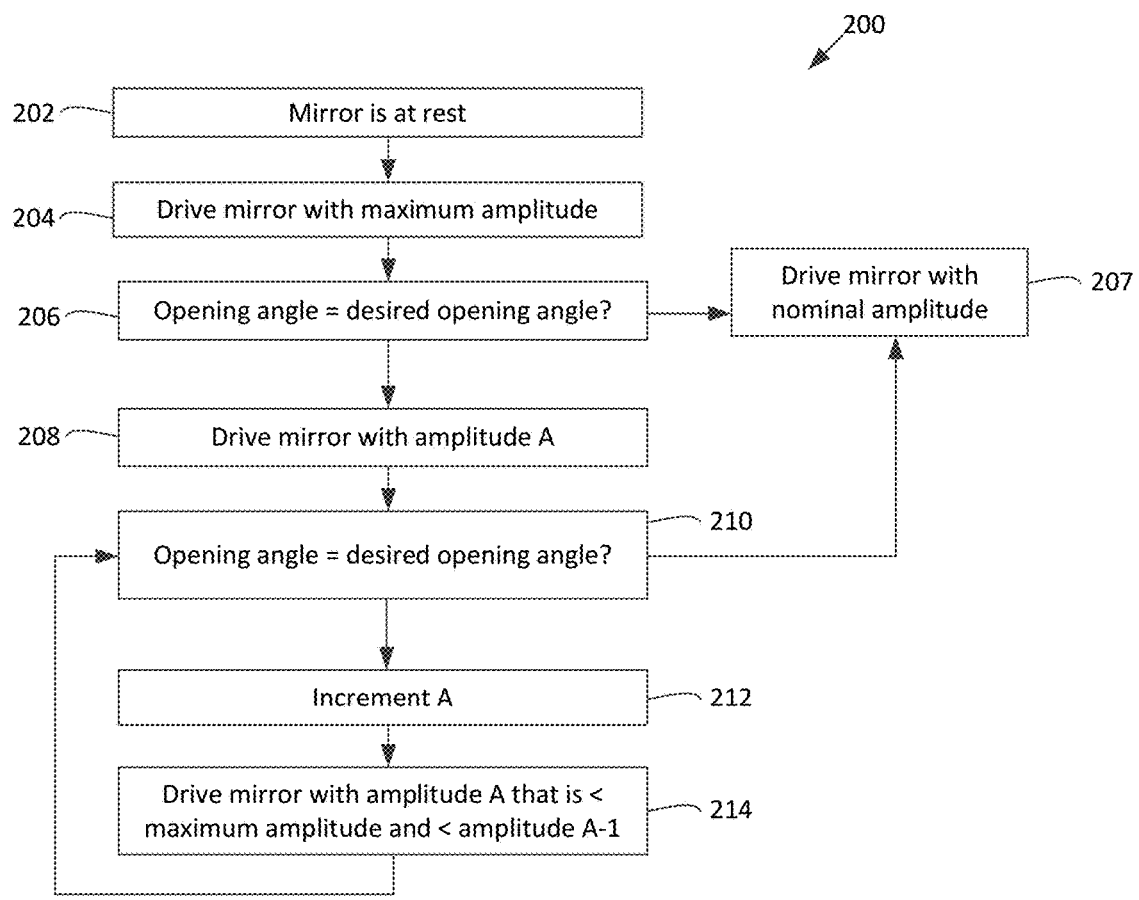
FIG. 4A is a flowchart showing operation of the picoprojector of FIG. 3A in closed loop mode using the start up techniques described herein.

Operation of the picoprojector 50 in a startup mode is now described with additional reference to FIG. 4A. Initially, the MEMS mirror 100 is at rest (Block 202). Then the mirror is driven with a drive signal 161 having an upper threshold (or maximum) amplitude Aint generatable by the driver 158 (Block 204), while the opening angle of the MEMS mirror 100 is monitored by the opening angle detector 154 in conjunction with the drive amplitude control block 156. If the opening angle has not reached the desired opening angle (Block 206), then the drive amplitude control block 156 generates the drive control signal 159 so as to cause the driver 158 to drive the MEMS mirror 100 with a drive signal 161 having an amplitude A that is less than the upper threshold amplitude but greater than a nominal amplitude to be used for normal operation once the picoprojector is operating in a standard mode of operation (Block 208). In some cases, this step at Block 208 may be performed if the opening angle has not reached the desired opening angle but has reached a threshold opening angle.

If the opening angle is now equal to the desired opening angle (Block 210), then the drive amplitude control block 156 generates the drive control signal 159 so as to cause the driver 158 to drive the MEMS mirror 100 with the nominal drive signal having amplitude Anom. If the opening angle is still not equal to the desired opening angle (Block 210), then the drive amplitude control block 156 generates the drive control signal 159 so as to cause the driver 158 to drive the MEMS mirror 100 with a drive signal 161 having an amplitude A-1 that is less than the upper threshold amplitude and less than amplitude N (Block 212 and 214). In some cases, this step at Block 214 may be performed if the opening angle has not reached the desired opening angle but has reached another threshold opening angle.

The opening angle is then checked again (Block 210), and the process continues—if the opening angle is equal to the desired opening angle, then the MEMS mirror 100 is driven with the drive signal 161 having the nominal amplitude (Block 207); if the opening angle is still unequal to the desired opening angle, then A is decremented again (Block 212), and the MEMS mirror 100 is driven with a drive signal 161 having an amplitude A-2 that is less than the upper threshold amplitude and less than amplitude A-1. This process repeats until the opening angle is equal to the desired opening angle.

Each of the driving signals 161 described above may be applied for a respective given time while the opening angle is monitored. These given times may each be the same, or may be different dependent on the value of A. In other instances, the adjustment described above may be performed continuously, or substantially continuously, instead of in discrete steps.

Figure 5:
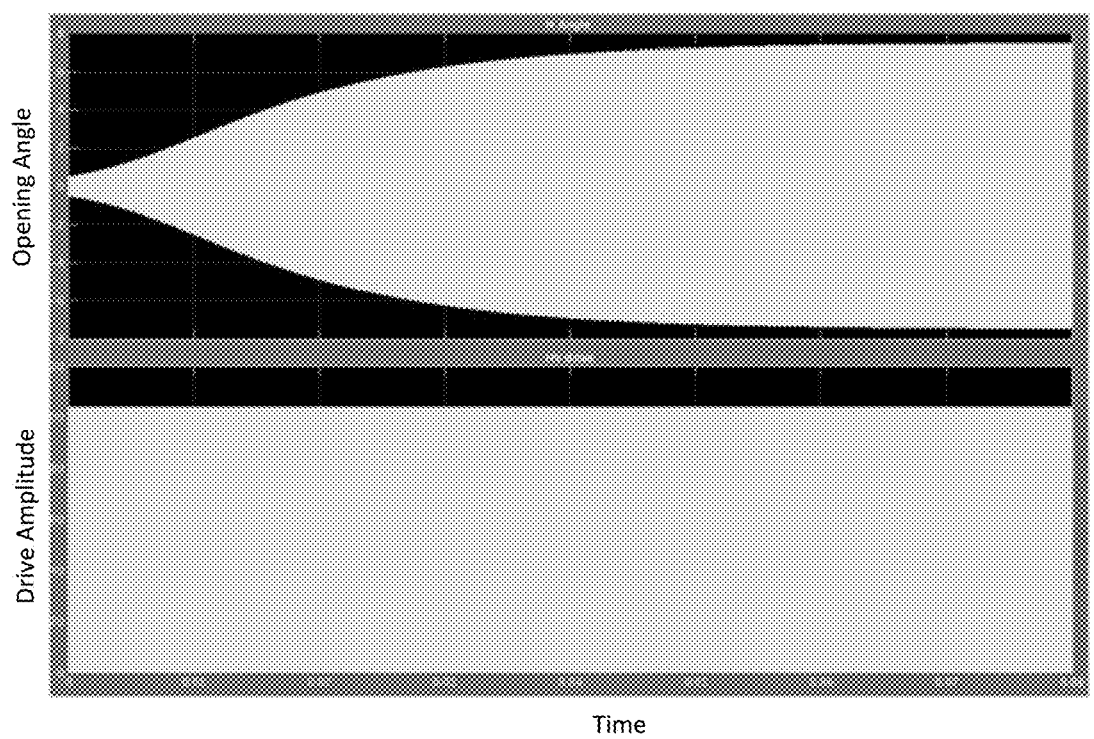
FIG. 5 is a graph showing opening angle vs. drive signal amplitude for a movable MEMS mirror using prior art start up techniques.
Figure 6:
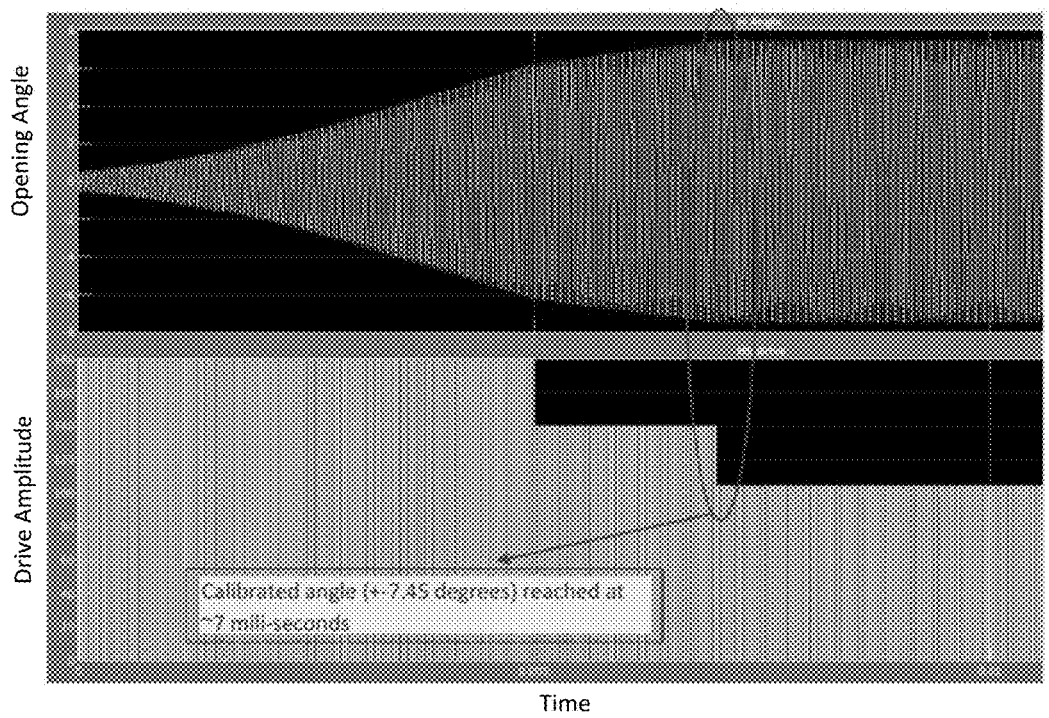
FIG. 6 is a graph showing opening angle vs. drive signal amplitude for a movable MEMS mirror using start up techniques described herein.

Simulation results using a drive signal of 21.5 KHz with a target opening angle of ±7.45 mechanical degrees are shown in FIGS. 5-6. In FIG. 5, results using prior art techniques in which the amplitude of the drive signal 161 is kept constant during start up, the targeted opening angle is reached in about 80 milliseconds. However, as can be seen in FIG. 6, using the techniques described herein, in a sample operation that included one intermediate drive signal amplitude between the upper threshold amplitude and the nominal amplitude, the targeted opening angle is reached in 7 milliseconds.

Figure 3B:
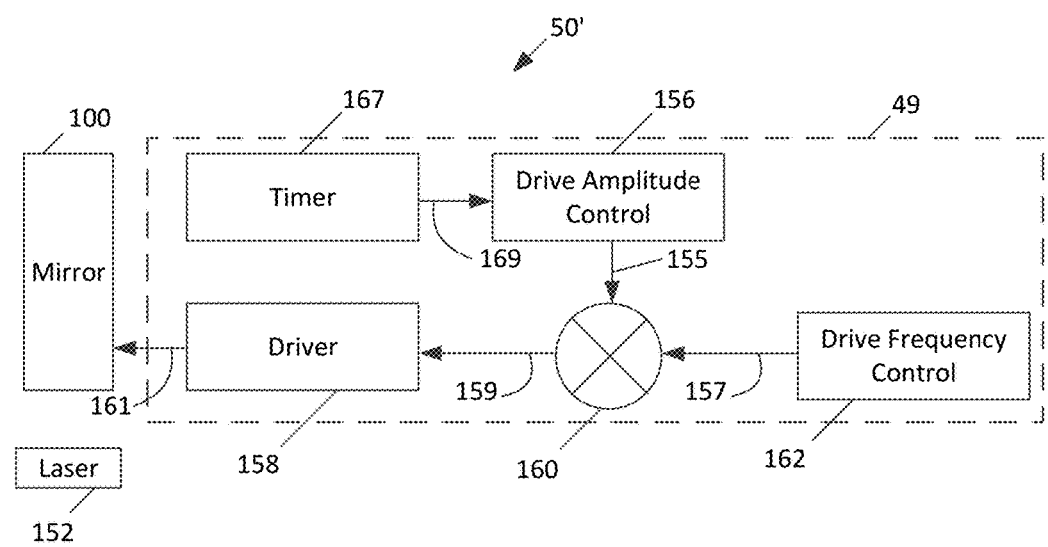
FIG. 3B is a block diagram of a picoprojector in accordance with this disclosure that does not utilize a feedback loop.

Although the technique as described above operates using the opening angle as feedback, in some cases, an open loop configuration may be used. The hardware setup 50' for this is shown in FIG. 3B, and does not contain an opening angle detector. Instead, a timer 167 is utilized, and provides a timer signal 169 to the drive amplitude control 156.

Figure 4B:
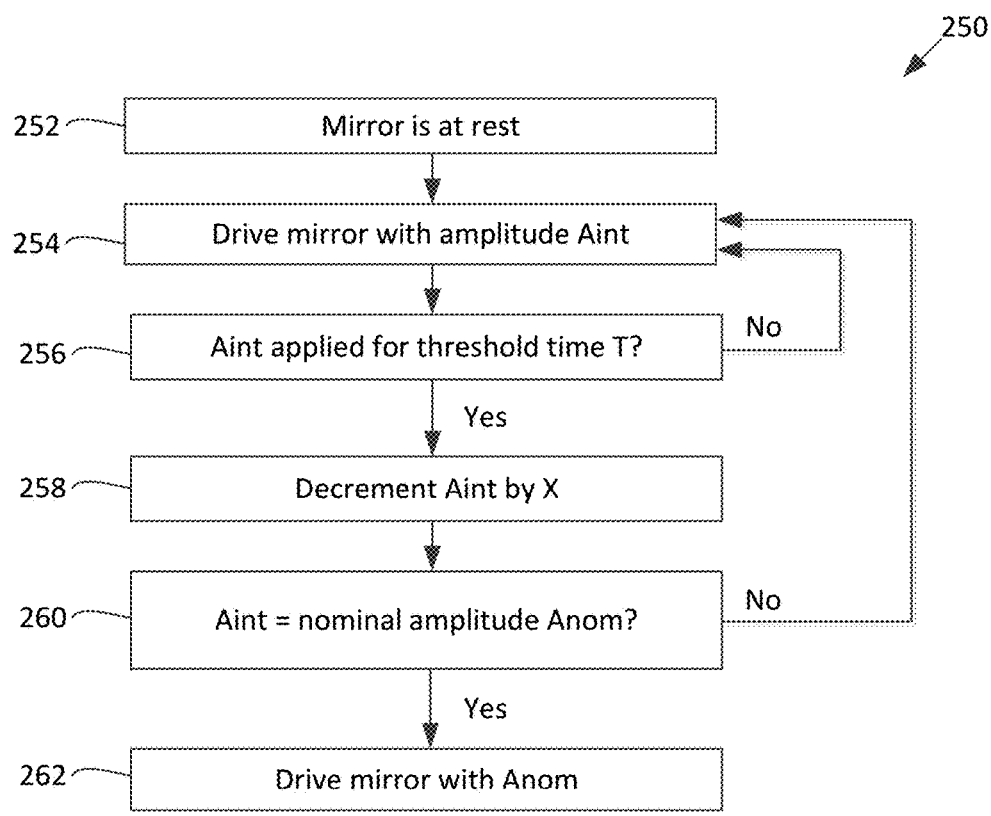
FIG. 4B is a flowchart showing operation of the picoprojector of FIG. 3B in open loop mode using the start up techniques described herein.

Open loop operation is described with reference to flowchart 250 of FIG. 4B. Initially, the mirror is at rest (Block 252). Thereafter, the mirror is driven with a drive signal having an amplitude Aint (Block 254), which may be a maximum amplitude, but may also be any amplitude greater than a nominal amplitude Anom. If the amplitude Aint has not yet been applied for at least a threshold time T (Block 256), then driving with the amplitude Aint continues (Block 254). If the amplitude Aint has been applied for at least the threshold time T (Block 256), then Aint is decremented by X (Block 258). If Aint is now equal to the nominal amplitude Anom (Block 260), then the mirror is driven with the nominal amplitude Anom (Block 262), and startup is complete. If Aint is not yet equal to the nominal amplitude (Block 260), then the operation returns to Block 254, and continues from there.

There can be one or multiple of such steps. Although this open loop version may in some cases be easier to implement, the reduction in startup time may not be as great as the setup using feedback as described above.

Stated another way, in general, the techniques herein include the initial driving of the MEMS mirror at a upper threshold drive signal amplitude at the beginning of a startup mode of operation, with the reduction of the drive signal amplitude over time until it is at a nominal drive signal amplitude for normal operation.

It should be appreciated that although the above techniques have been described with respect to the control circuitry 49 being within a picoprojector 50, they may be used on any device employing a MEMS mirror 100.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A control circuit for a movable mirror, the control circuit comprising:
   driving circuitry configured to drive the movable mirror with a drive signal to effectuate oscillating of the movable mirror;
   opening angle determination circuitry configured to determine an opening angle of the movable mirror; and
   amplitude control circuitry configured to:
      a) first cause the driving circuitry to generate the drive signal as having an upper threshold drive amplitude to transition the movable mirror from a rest state to oscillation at a desired opening angle; and
      b) once the movable mirror is oscillating at the desired opening angle, then cause the driving circuitry to generate the drive signal as having a nominal drive amplitude sufficient to maintain the oscillation of the movable mirror at the desired opening angle, the nominal drive amplitude being less than the upper threshold drive amplitude.

2. The control circuit of claim 1, wherein the amplitude control circuitry is further configured to:
   between a) and b), cause the driving circuitry to generate the drive signal as having a first drive amplitude less than the upper threshold drive amplitude but greater than a nominal drive amplitude, as a function of the opening angle of the movable mirror being not equal to a desired opening angle of the movable mirror.

3. The control circuit of claim 2, wherein the amplitude control circuitry is further configured to:
  iteratively cause the driving circuitry to generate the drive signal as having a drive amplitude that is less than the drive amplitude of a previous iteration, as a function of the opening angle of the movable mirror being not equal to the desired opening angle of the movable mirror.

4. A control circuit for a movable mirror, the control circuit comprising:
  driving circuitry configured to drive the movable mirror with a drive signal to effectuate oscillating of the movable mirror; and
  amplitude control circuitry configured to:
    cause the driving circuitry to generate the drive signal as having an amplitude that decreases from an upper threshold amplitude that transitions the movable mirror from a rest state to oscillation at a desired opening angle to a nominal drive amplitude over time, the nominal drive amplitude being less than the upper threshold amplitude.

5. The control circuit of claim 4, wherein the amplitude control circuitry causing the driving circuitry to generate the drive signal as having an amplitude that decreases from an upper threshold amplitude to a nominal drive amplitude over time comprises:
  causing the driving circuitry to generate the drive signal as having an upper threshold drive amplitude for a first period of time;
  after the first period of time, iteratively causing the driving circuitry to generate the drive signal as having a drive amplitude that is less than the drive amplitude of a previous iteration, until an iteration is reached where the drive amplitude is equal to a nominal drive amplitude.

6. The control circuit of claim 4, wherein the amplitude control circuitry causing the driving circuitry to generate the drive signal as having an amplitude that decreases from an upper threshold amplitude to a nominal drive amplitude over time comprises:
  causing the driving circuitry to generate the drive signal as having an upper threshold drive amplitude;
  monitoring an opening angle of the movable mirror; and
  causing the driving circuitry to generate the drive signal as having a nominal drive amplitude, as a function of the opening angle of the movable mirror being equal to a desired opening angle.

7. The control circuit of claim 6, wherein the amplitude control circuitry is further configured to:
  cause the driving circuitry to generate the drive signal as having a first drive amplitude less than the upper threshold drive amplitude but greater than a nominal drive amplitude, as a function of the opening angle of the movable mirror being greater than a threshold value but not equal to a desired opening angle of the movable mirror.

8. The control circuit of claim 6, wherein the amplitude control circuitry is further configured to:
  iteratively cause the driving circuitry to generate the drive signal as having a drive amplitude that is less than the drive amplitude of a previous iteration, as a function of the opening angle of the movable mirror being greater than a threshold value but not equal to the desired opening angle of the movable mirror.

9. A picoprojector, comprising:
  a movable mirror;
  driving circuitry configured to drive the movable mirror with a drive signal to effectuate oscillating of the movable mirror;
  an opening angle monitor associated with the movable mirror and configured to monitor an opening angle of the movable mirror;
  a laser configured to impinge on, and be reflected by, the movable mirror; and
  amplitude control circuitry configured to:
    cause the driving circuitry to generate the drive signal as having an upper threshold drive amplitude to transition the movable mirror from a rest state to oscillation at a desired opening angle; and
    once the movable mirror is oscillating at the desired opening angle, cause the driving circuitry to generate the drive signal as having a nominal drive amplitude sufficient to maintain the oscillation of the movable mirror at the desired opening angle, the nominal drive amplitude being less than the upper threshold drive amplitude.

10. The picoprojector of claim 9, wherein the amplitude control circuitry is further configured to:
  cause the driving circuitry to generate the drive signal as having a first drive amplitude less than the upper threshold drive amplitude but greater than a nominal drive amplitude, as a function of the opening angle of the movable mirror being greater than a threshold value but not equal to a desired opening angle of the movable mirror.

11. The picoprojector of claim 10, wherein the amplitude control circuitry is further configured to:
  iteratively cause the driving circuitry to generate the drive signal as having a drive amplitude that is less than the drive amplitude of a previous iteration, as a function of the opening angle of the movable mirror being not equal to the desired opening angle of the movable mirror.

12. A method of driving a movable mirror from rest to a desired opening angle, the method comprising:
  monitoring an opening angle of the movable mirror;
  initially driving the movable mirror with a drive signal having an upper threshold drive amplitude to transition the movable mirror from rest to oscillation at the desired opening angle;
  if the opening angle of the movable mirror is equal to the desired opening angle, then drive the movable mirror with a drive signal having a nominal drive amplitude sufficient to maintain the oscillation of the movable mirror at the desired opening angle, the nominal drive amplitude being less than the upper threshold drive amplitude; and
  if the opening angle of the movable mirror is less than the desired opening angle, then over time decrease the drive amplitude of the drive signal until the opening angle of the movable mirror is equal to the desired opening angle.

13. The method of claim 12, wherein decreasing the drive amplitude of the drive signal over time comprises changing the drive amplitude of the drive signal to an intermediate amplitude that is greater than the nominal drive amplitude but less than the upper threshold drive amplitude.

14. The method of claim 12, wherein decreasing the drive amplitude of the drive signal over time comprises iteratively generating the drive signal as having a drive amplitude that is less than the drive amplitude of a previous iteration until the drive amplitude of a present iteration is equal to the nominal drive amplitude.

* * * * *